United States Patent
Olarig et al.

(10) Patent No.: US 11,003,229 B2
(45) Date of Patent: May 11, 2021

(54) COST-EFFECTIVE SOLID STATE DISK DATA PROTECTION METHOD FOR HOT REMOVAL EVENT

(71) Applicant: Samsung Electronics Co., Ltd., Suwon-si (KR)

(72) Inventors: Sompong Paul Olarig, Pleasanton, CA (US); Ramdas P Kachare, Cupertino, CA (US); Wentao Wu, Milpitas, CA (US)

(73) Assignee: SAMSUNG ELECTRONICS CO., LTD.

( * ) Notice: Subject to any disclaimer, the term of this patent is extended or adjusted under 35 U.S.C. 154(b) by 205 days.

(21) Appl. No.: 16/111,167

(22) Filed: Aug. 23, 2018

(65) Prior Publication Data

US 2020/0004311 A1  Jan. 2, 2020

Related U.S. Application Data

(60) Provisional application No. 62/693,250, filed on Jul. 2, 2018.

(51) Int. Cl.
*G06F 1/30* (2006.01)
*G06F 1/28* (2006.01)
*G06F 3/06* (2006.01)

(52) U.S. Cl.
CPC .......... *G06F 1/30* (2013.01); *G06F 1/28* (2013.01); *G06F 3/0604* (2013.01); *G06F 3/0659* (2013.01); *G06F 3/0679* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,912,155 B2 * | 6/2005 | Sakurai | ............... | G11C 16/225 365/185.02 |
| 6,970,346 B2 * | 11/2005 | Shih | .................. | G06F 1/181 307/65 |
| 7,269,755 B2 * | 9/2007 | Moshayedi | ......... | G06F 11/1441 714/2 |
| 8,169,192 B2 * | 5/2012 | Yamazaki | ............ | H01M 10/425 320/136 |
| 8,230,257 B2 * | 7/2012 | Wilson | ................... | G11C 5/141 714/14 |

(Continued)

*Primary Examiner* — Amine Riad
(74) *Attorney, Agent, or Firm* — Renaissance IP Law Group LLP (57) ABSTRACT

A system is disclosed that provides emergency backup power to a solid-state drive (SSD) that may not contain any internal supercapacitors. The SSD may include a first connector and a hold-up power supply. The first connector may have a predetermined form factor and may being capable of being connected to a corresponding connector of a midplane of a storage system. The first connector may include a main power connection that is connected to a main power supply of the midplane if the first connector is connected to the corresponding connector of the midplane. The hold-up power supply may be internal to the SSD, and may receive hold-up energy from an external energy source for a predetermined amount of time after the first connector has been disconnected from the main power connection of the midplane so that the SSD may store any host data write requests that the SSD has acknowledged.

22 Claims, 7 Drawing Sheets

(56) References Cited

U.S. PATENT DOCUMENTS

| | | | | |
|---|---|---|---|---|
| 8,872,485 | B1* | 10/2014 | Kung | H02J 7/345 |
| | | | | 323/222 |
| 9,223,664 | B1* | 12/2015 | Watson | G06F 11/1441 |
| 9,710,343 | B2 | 7/2017 | Petersen | |
| 9,997,209 | B2* | 6/2018 | Zhou | G06F 12/16 |
| 2007/0028122 | A1 | 2/2007 | Chuang | |
| 2009/0262581 | A1* | 10/2009 | Sakurai | G11C 16/225 |
| | | | | 365/185.18 |
| 2010/0215359 | A1 | 8/2010 | Li et al. | |
| 2010/0332826 | A1* | 12/2010 | Lin | G06F 21/10 |
| | | | | 713/158 |
| 2010/0332860 | A1* | 12/2010 | Trantham | G06F 1/263 |
| | | | | 713/300 |
| 2013/0094135 | A1* | 4/2013 | Davis | G11B 33/128 |
| | | | | 361/679.31 |
| 2015/0378415 | A1* | 12/2015 | George | G06F 1/30 |
| | | | | 307/64 |
| 2016/0118121 | A1* | 4/2016 | Kelly | G11C 14/0018 |
| | | | | 710/301 |
| 2017/0090538 | A1* | 3/2017 | Wang | G11C 5/14 |
| 2017/0277245 | A1* | 9/2017 | Paley | G06F 11/3058 |
| 2017/0352422 | A1* | 12/2017 | Pardoe | G11C 16/14 |
| 2018/0032120 | A1 | 2/2018 | Maheswaran et al. | |
| 2018/0322011 | A1* | 11/2018 | Batcheller | G06F 11/2015 |
| 2019/0104632 | A1* | 4/2019 | Nelson | G06F 1/183 |
| 2020/0039454 | A1* | 2/2020 | Hsieh | B60L 50/40 |
| 2020/0133379 | A1* | 4/2020 | Muccini | H02M 3/07 |

\* cited by examiner

COST-EFFECTIVE SOLID STATE DISK DATA PROTECTION METHOD FOR HOT REMOVAL EVENT

CROSS-REFERENCE TO RELATED APPLICATION

This patent application claims the priority benefit under 35 U.S.C. § 119(e) of U.S. Provisional Patent Application No. 62/693,250, filed on Jul. 2, 2018, the disclosure of which is incorporated herein by reference in its entirety.

TECHNICAL FIELD

The subject matter disclosed herein generally relates to a system that provides emergency backup power to a solid-state drive (SSD) that may not contain any internal supercapacitors by supplying the emergency backup power through a separate cable or wire and/or wirelessly to the SSD.

BACKGROUND

A primary responsibility of components involved in a data center is to prevent, or otherwise help minimize, the possibility of permanent data loss. Measures for preventing permanent data loss may take many forms. For example, many current SSDs provide the capability of detecting an imminent loss of an external power supply (i.e., a sudden power-off (SPO) event). Such an imminent SPO may threaten host data integrity by a potential loss of acknowledged host write request information and/or by potentially corrupting critical SSD controller data structures.

Supercapacitors (supercaps) located internally to an SSD are one typical measured used to prevent data loss if an imminent SPO is detected. The supercaps are used to provide a temporary hold-up power for an emergency operation to store at-risk data. That is, the supercaps store energy that provides additional, temporary power for in-flight or pending write data in volatile DRAM to be stored in persistent memory. One objective associated with supercaps is to provide enough power to complete a worst-case maximum, pending write data scenario before the energy available in the supercaps has been exhausted.

When an SSD device that includes internal supercaps detects an SPO event on the power supply lines (typically the 12V/5V/3.3V power supply lines), the SSD may immediately generate a powerfail_detected signal that switches the power source of the SSD to the internal supercap power reservoir, and that causes the critical data to be flushed to persistent storage media. The critical data that may need to be preserved may include any host data write request that the SSD has acknowledged, and may optionally include SSD controller state information that, when available in persistent memory after device restart, dramatically accelerates device state instantiation and storage function resumption. It should be noted that a SSD does not need to preserve a host write request that the SSD has received, but not acknowledged. In such a situation, the responsibility remains with the host device to recover any unacknowledged write request activity.

SSD form-factor requirements necessarily dictate that SSD supercaps be physically small. Relatively small supercaps, however, store relatively less electrical energy. Nevertheless, for most SSDs, the number of small-sized supercaps may be large. For example, current SSDs may use more than 30 internal supercaps, which means that a 2U chassis that is fully loaded with 24 SSDs may include more than 700 supercaps. Not only is the number of supercaps that are used large, the supercaps are individually (and therefore collectively) relatively expensive. Additionally, supercaps are failure prone, degrade over time and, most importantly, consume precious SSD board space. In order to meet a warranty period, SSD manufacturers typically over provision the capacity of the supercaps to compensate for the degradation and reliability factors associated with supercaps.

SUMMARY

An example embodiment provides SSD that may include a first connector and a hold-up power supply. The first connector may have a predetermined form factor and may be capable of being connected to a corresponding connector of a midplane. The first connector may include a main power connection that is connected to a main power supply of the midplane when the first connector is connected to the corresponding connector of the midplane. The hold-up power supply may be internal to the SSD, and may receive hold-up energy from an external energy source for a predetermined amount of time after the first connector has been disconnected from the main power connection of the midplane in which the predetermined amount of time may include an amount of time for the SSD to store host data write requests that the SSD has acknowledged. In one embodiment, the predetermined amount of time may further include an amount of time for the SSD to store any controller state data of the SSD. In another embodiment, the SSD may further include a write data cache having a size that may be configurable and enabled. In one embodiment, the first connector may further include at least one elongated pin through which the hold-up energy is received by the hold-up power supply for the predetermined amount of time. In another embodiment, the SSD may include at least one second connector coupled to the hold-up power supply and that may be capable of being connected to the external energy source, such as the midplane and/or another SSD. In still another embodiment, the hold-up power supply may be wirelessly coupled to the external energy source through a radio-frequency coupling or a light (optical) link.

Another example embodiment provides a storage system may include a midplane and at least one SSD. The midplane may include at least one first connector having a predetermined form factor and that may be capable of being connected to an SSD having a corresponding connector that mates to the at least one first connector and in which the at least one first connector may include a main power connection. The at least one SSD may include a second connector and a hold-up power supply. The second connector may have the predetermined form factor and may be capable of being connected to a corresponding first connector of the midplane. The second connector may include a main power connection that may be connected to the main power connection of the midplane if the second connector is connected to the corresponding first connector of the midplane. The hold-up power supply may be internal to the SSD and may receive hold-up energy from an external energy source for a predetermined amount of time after the first connector has been disconnected from the main power connection of the midplane in which the predetermined amount of time may include an amount of time for the at least one SSD to store host data write requests that the SSD has acknowledged. In one embodiment, the predetermined amount of time further may include an amount of time for the SSD to store any controller state data of the SSD. In another embodiment, the SSD may further include a write data cache having a size that may be configurable and enabled. In one embodiment, the first connector may further include at least one elongated pin through which the hold-up energy may be received by the hold-up power supply for the predetermined amount of time. The at least one SSD may further include at least one second connector coupled to the hold-up power supply and may be capable of being connected to the external energy source in which the second connector may be further capable of receiving a corresponding connector at a first end of a cable connected to the external energy source in which a second end of the cable may be connected to the external energy source is fastened to the midplane or to a second SSD. In one embodiment, the hold-up power supply may be wirelessly coupled to the external energy source through a radio-frequency coupling to the midplane or to a second SSD and/or through an optical link.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The subject matter disclosed herein provides a technique for an SSD that does not include any internal supercaps to preserve critical data if an SPO event is detected. Embodiments disclosed herein provide that an SSD continues to receive emergency hold-up, or backup, power for a short predetermined period of time after an SPO event has been detected. In some embodiments, the short-term emergency hold-up power may be provided to the SSD by elongated connector pins and/or a physical cable or wire. In other embodiments, the short-term emergency hold-up power may be provided wirelessly to the SSD.

In embodiments in which short-term emergency hold-up power may be provided to an SSD by a physical cable or wire, the length of the cable or wire may be selected to provide the emergency hold-up power for a predetermined period of time after the main power supply has been disconnected if, for example, the SSD has been suddenly pulled out of a chassis of a storage system (i.e., an SPO that may be a hot removal event or a surprise removal event). For example, if 80 Mbytes may be flushed to a NAND of an SSD in 10 ms, then the length of a cable or wire that provides the emergency hold-up power may be selected to provide 10 ms of emergency power as the SSD is pulled out of a chassis before the emergency hold-up power becomes disconnected from the SSD. Some embodiments disclosed herein provide that an SSD may be capable of supplying emergency hold-up power to a neighboring SSD. In embodiments in which short-term emergency hold-up power is provided wirelessly to an SSD, the signal strength of a radio-frequency signal or the light intensity of a light signal may be selected to provide, for example, 10 ms of emergency power before the wireless connection becomes too weak to supply the power.

One benefit provided by the subject matter disclosed herein is that most, if not all, internal SSD supercaps may be eliminated, and the space vacated by internal supercaps within an SSD may be repurposed to provide additional non-volatile storage media, thereby increasing the data storage capacity of an SSD. Further, the cost associated with an SSD may be reduced by removing supercaps from the SSD.

The subject matter disclosed herein may also support a more reliable hybrid data loss protection (DLP) solution at the system level in which some SSD devices in a storage system may have internal supercaps, while other SSD devices may have no internal supercaps while still being part of a system-level data loss prevention solution. Embodiments of SSDs disclosed herein may be seamlessly integrated into an existing DLP solution because the embodiments disclosed herein may be used in a data storage system that includes legacy SSDs having internal supercaps. It should be understood that the term "data loss protection (DLP)" may be interchangeably used herein with the term "power loss protection (PLP)."

Embodiments of SSDs disclosed herein provide a write data cache (WDC) in a volatile memory that has a selectably configurable sized and that may be selectably enabled. A DLP solution manager, such as a baseboard management controller (BMC), may query the SSDs in a data storage system to determine whether the SSD includes an WDC that is size configurable, is selectably enabled, and whether emergency hold-up power may be supplied from the SSD to a neighboring SSD via a wire or wirelessly. If, for example, an embodiment of an SSD device disclosed herein is suddenly pulled out of a chassis, the amount of energy that would be needed to prevent data loss would depend on the size of the write data cache and some additional flash translation layer (FTL) data structures that must be written (flushed) to the flash memory. Any logic circuitry that is not needed for flushing data to the flash memory would be immediately powered down by the SSD controller to conserve the power. Based on the capabilities of an SSD, the BMC would be able to optimally configure the size of the WDC of the SSD based on the DLP system resources available. Additionally, the selectively enabled WDC may improve write performance, reduce write latency of the SSD, and improve read performance in the event of a cache hit.

Figure 1A:
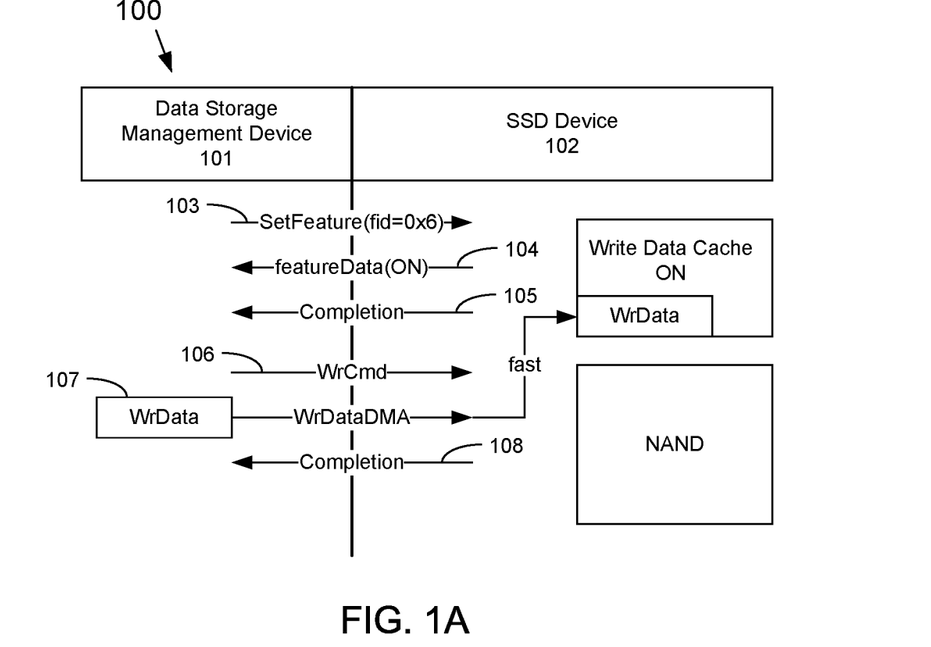
FIGS. 1A and 1B respectively depict signal flow diagrams between a data-storage management device and an SSD device in a data storage system that may be used to selectively enable a write data cache of the SSD device according to the subject matter disclosed herein.
Figure 1B:
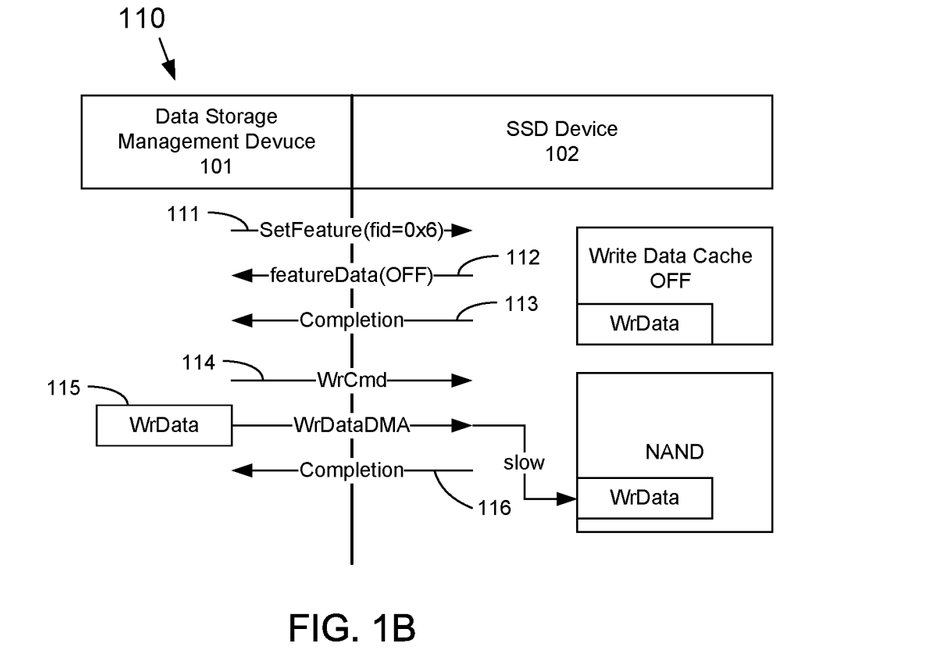

FIGS. 1A and 1B respectively depict signal flow diagrams 100 and 110 between a data-storage management device 101 and an SSD device 102 in a data storage system that may be used to selectively enable a WDC of the SSD device according to the subject matter disclosed herein. In one embodiment, the management device 101 may be a BMC, and the SSD device 102 may be capable of detecting whether it supports a size-configurable WDC and a write cache enable (WCE) functionality and is capable of communicating the functionality to the data storage management device 101. Additionally, the SSD device 102 may be capable of detecting whether it is capable of providing emergency backup power to a neighboring SSD and communicating that capability to the management device 101.

It should be understood that a data storage system that may include the management device 101 and the SSD device 102 may actually include a plurality of management devices 101 and a plurality of SSD devices 102.

The WCE functionality of an SSD device 102 may be supported by various protocols, such as, but not limited to, a Feature Command (featureId=0x06) in NVMe. In one embodiment, the management device 101 may capable of determining whether to enable or disable the write cache based on a power backup mechanism solution for the storage system. In another embodiment, whether an SSD device 102 has a WCE functionality that is ON or OFF is dependent on the device rather than a power backup mechanism solution for the storage system.

As depicted in FIG. 1A, the management device 101 may enable the WDC functionality of the SSD device 102 by sending at 103 a SetFeature command to enable the WDC functionality. At 104, the SSD device 102 responds with a featureData(ON) message, and at 105 with a completion message. With the WCE functionality enabled in the SSD device 102, the management device 101 and/or a host device (not shown) will expect a low latency for a write command WriteCmd. Sometime later at 106, the host device sends a write command WrCmd, which is followed the WrData 107. The WrData 107 is written to the write data cache and the SSD device 102 sends a Completion message at 108. The write of the WrData 107 is indicated in FIG. 1A as being "fast" even though the WrData 107 has not yet been written to the non-volatile (NAND) memory. Subsequently, the SSD device writes the WrData 107 to the NAND memory of the SSD device 102. Communication flow between the management device 101 and the SSD device 102 that relates to setting a size of the WDC and whether the SSD device 102 may be capable of providing emergency backup power to a neighboring SSD may be similar to the communication flow depicted in FIG. 1A.

In FIG. 1B, the management device 101 may disable the WDC functionality of the SSD device 102 by sending at 111 a SetFeature command to disable the WDC functionality. At 112, the SSD device 102 responds with a featureData(OFF) message, and at 113 with a completion message. Sometime later at 114, a host device (not shown) sends a write command WrCmd, which is followed the WrData 115. The WrData 115 is written to the non-volatile (NAND) memory and the SSD device 102 sends a Completion message at 116. The write of the WrData 115 is indicated as being "slow" because the completion message is not sent to the host device until the WrData 115 has actually been written to the NAND memory.

An SSD having an WDC with a selectably configurable size and that is selectably enabled may be supplied with short-term emergency power by a physical cable and/or wirelessly. For example, one embodiment of the subject matter disclosed herein includes a separate backup power line that has a predetermined length and a special connector that provides an emergency hold-up power for a predetermined length of time (such as 10 ms) after an SPO event has been detected. For example, 10 ms of emergency backup power may allow 80 Mbytes of data to be flushed to NAND after detecting an SPO event. In this example, the management device may enable a write cache of 80 Mbyte on the SSD device in order to improve write performance and write latency.

Figure 2A:
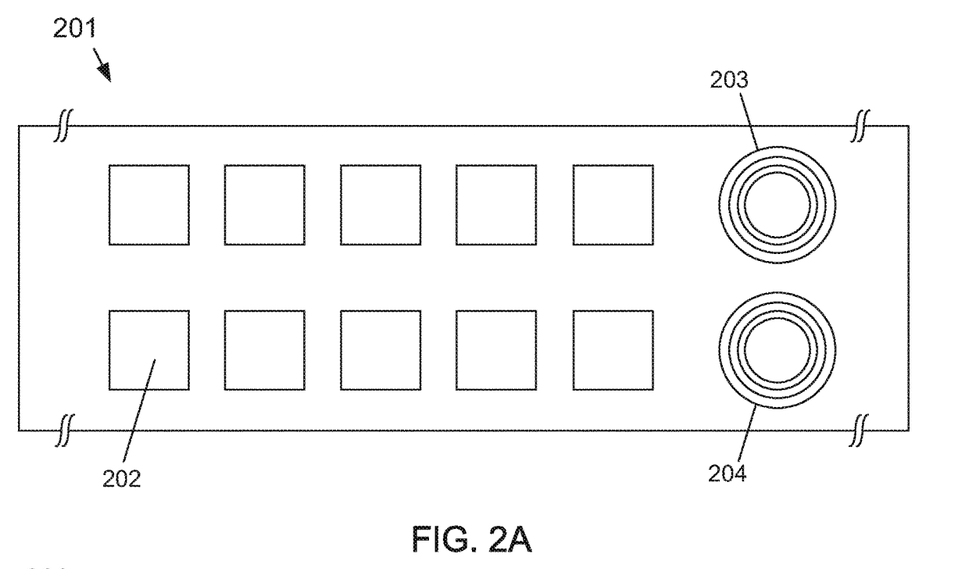
FIGS. 2A and 2B respectively depict an example embodiment of a portion of a connector and a first example embodiment of a storage system that provides an emergency hold-up power to an SSD for a predetermined length of time after an SPO event occurs according to the subject matter disclosed herein.
Figure 2B:
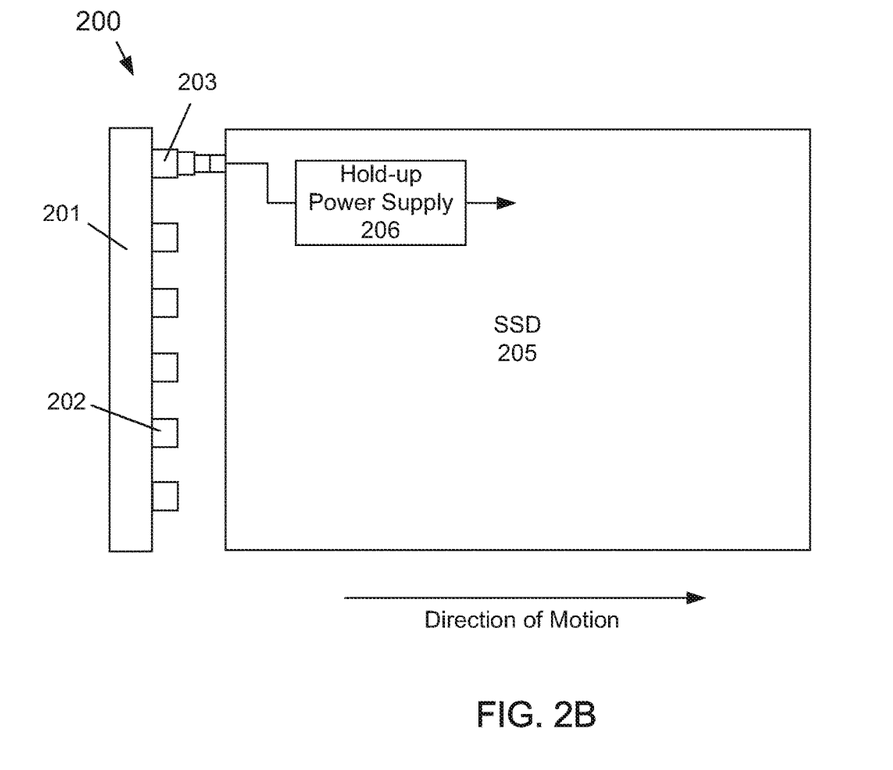

FIGS. 2A and 2B respectively depict an example embodiment of a portion of a connector 201 and a first example embodiment of a storage system 200 that provides an emergency hold-up power to an SSD for a predetermined length of time after an SPO event occurs according to the subject matter disclosed herein. The connector 201 may include a plurality of pins 202, one or more elongated power pins 203, and one or more elongated ground pins 204. In one embodiment, the one or more elongated ground pins may be longer than the one or more elongated power pins 203. The pins 202 may provide data, addressing and/or control signals, and/or the typical 12V/5V/3.3V power supply lines that are normally used in current storage systems. An SSD 205 (FIG. 2A) may have a corresponding connector that mates, or connects, to the connector 201.

FIG. 2B depicts a portion of the first example embodiment of a storage system 200 that includes the connector 201. As the SSD 205 is being disconnected (i.e., the direction of motion) from the connector 201, the pins 202 of the connector 201 become disconnected before the elongated pins 203 and 204 become disconnected. The elongated pins 203 and 204 are connected to a hold-up power supply 206 that is internal to the SSD 205. The SSD 205 detects the immediate loss of power and generates, for example, an internal powerfail_detected signal that switches the power source of the SSD to the hold-up power supply 206, and that triggers flushing of any host data write request that the SSD has acknowledged (and is still stored in the write data cache) and (optionally) any critical SSD controller state information. The length of the elongated power pins 203 and ground pins 204 may be selected based on the time needed to flush a predetermined amount of data in a write data cache. The predetermined amount of time for flushing data in the write data cache is referred to herein as the PLP window Δt. If, for example, a PLP window Δt of 10 ms of emergency backup power is needed to allow 80 Mbytes of data to be flushed to NAND, the length of the elongated power/ground pins 203/204 is selected to be the distance that an SSD moves in 10 ms as the SSD is disconnected from the pins 202 of the connector 201. In one embodiment, the distance that an SSD moves in the predetermined amount of time may be based on an estimate of an average speed that an SSD may be disconnected from the connector 201. In another embodiment, the distance that an SSD moves in the predetermined amount of time may be based on a worst-case maximum speed that the SSD may be disconnected from the connector 201.

Figure 3:
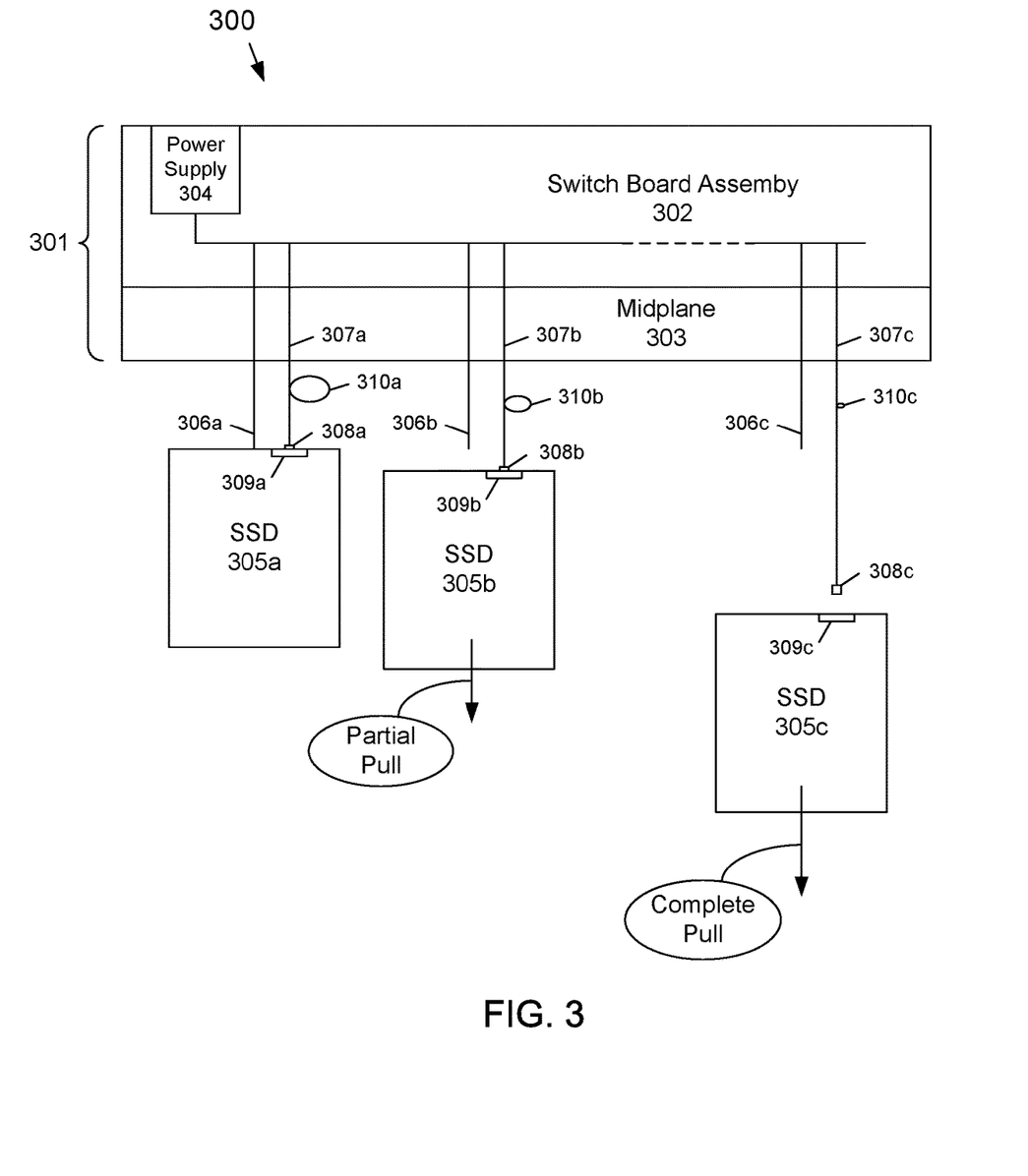
FIG. 3 depicts a block diagram of a second example embodiment of a storage system that includes a separate backup power line that provides an emergency hold-up power to an SSD for a predetermined length of time after an SPO event occurs according to the subject matter disclosed herein.

FIG. 3 depicts a block diagram of a second example embodiment of a storage system 300 that includes a separate backup power line that provides an emergency hold-up power to an SSD for a predetermined length of time after an SPO event occurs according to the subject matter disclosed herein. The storage system 300 includes a chassis 301, a switch or mother board assembly 302 and a midplane 303. A power supply 304 may be part of the switch board or mother board assembly 302. Three SSDs 305a-305c are depicted in different connective relationships with the midplane 303. For the example embodiment depicted in FIG. 3, the midplane 303 includes three main power connections 306a-306c. Each main power connection 306a-306c may include the typical 12V/5V/3.3V power supply lines that are normally used in current storage systems. In some embodiments, the power connections 306a-306c may be supplied through standard M.2 or U.2 connectors. It should be understood that the storage system 300 depicted in FIG. 3 may include more or fewer switch or mother board assemblies 302, midplanes 303, power supplies 304 and SSDs 305 than depicted in FIG. 3. It should also be understood that the terms "switch board" and "mother board" may be used interchangeably herein.

Additionally, the chassis 301 includes a separate backup power lines for each SSD slot. For the example embodiment depicted in FIG. 3, three separate backup power lines 307a-307c are provided. Each respective backup power line 307a-307c includes a connector 308a-308c that is connectable to a corresponding connector 309a-309c on an SSD 305. A hold-up power supply (not shown in FIG. 3) is connected to a connector 309 of an SSD 305. In one embodiment, a connector 308 may be coupled, or adhered, to a corresponding connector 309 on an SSD 305 using a relatively weak magnetic force. Each backup power line 307 has a length that is longer than is physically necessary to merely connect to an SSD 307, as indicated by a service loop 310. One end of each of the backup power lines 307 is fastened to, for example, the midplane 303 in a well-known manner.

The SSD 305a is depicted as being fully plugged into the midplane 303. Power for the SSD 305a is supplied through the main power connection 306a, and a backup power line 307a is coupled to the connector 309a on the SSD 305a.

The SSD 305b is depicted as being partially pulled out from the midplane 303 to the extent that the main power connection 306b has been disconnected. The SSD 305b detects the immediate loss of power and generates, for example, an internal powerfail_detected signal that switches the power source of the SSD to the hold-up power supply (not shown) that is internal to the SSD, and that triggers flushing of any host data write request that the SSD has acknowledged (and is still stored in the write data cache) and (optionally) any critical SSD controller state information. Emergency backup power may be supplied through the line 307b as the SSD 305b is pulled from the midplane 303. The relatively weak magnetic force adhering the connector 308b to the SSD connector 309b may be sufficiently strong to keep the two connectors connected as the SSD 305*b* is being pulled out from the midplane 303.

The SSD 305*c* is depicted as being completely pulled out from the midplane 303 to the extent that the connector 308*c* has become disconnected from the connector 309*c* of the SSD 305*c*. By this time in the sequence of pulling an SSD out from the midplane 303, the SSD has flushed any data that needed to be saved. The length of the backup power supply lines 307*a*-307*c* may be selected based on the time needed to flush a predetermined amount of data in a write data cache. The predetermined amount of time for flushing data in the write data cache is referred to herein as the PLP window Δt. If, for example, a PLP window Δt of 10 ms of emergency backup power is needed to allow 80 Mbytes of data to be flushed to NAND, the length of a power supply line 307 is selected to be the distance that an SSD moves in 10 ms as it is pulled out from the midplane 303 and is moved away from the midplane 303. In one embodiment, the distance that an SSD moves in the predetermined amount of time may be based on an estimate of an average speed that an SSD may be removed from the midplane 303. In another embodiment, the distance that an SSD moves in the predetermined amount of time may be based on a worst-case maximum speed that the SSD may be removed from the midplane 303.

Figure 4:
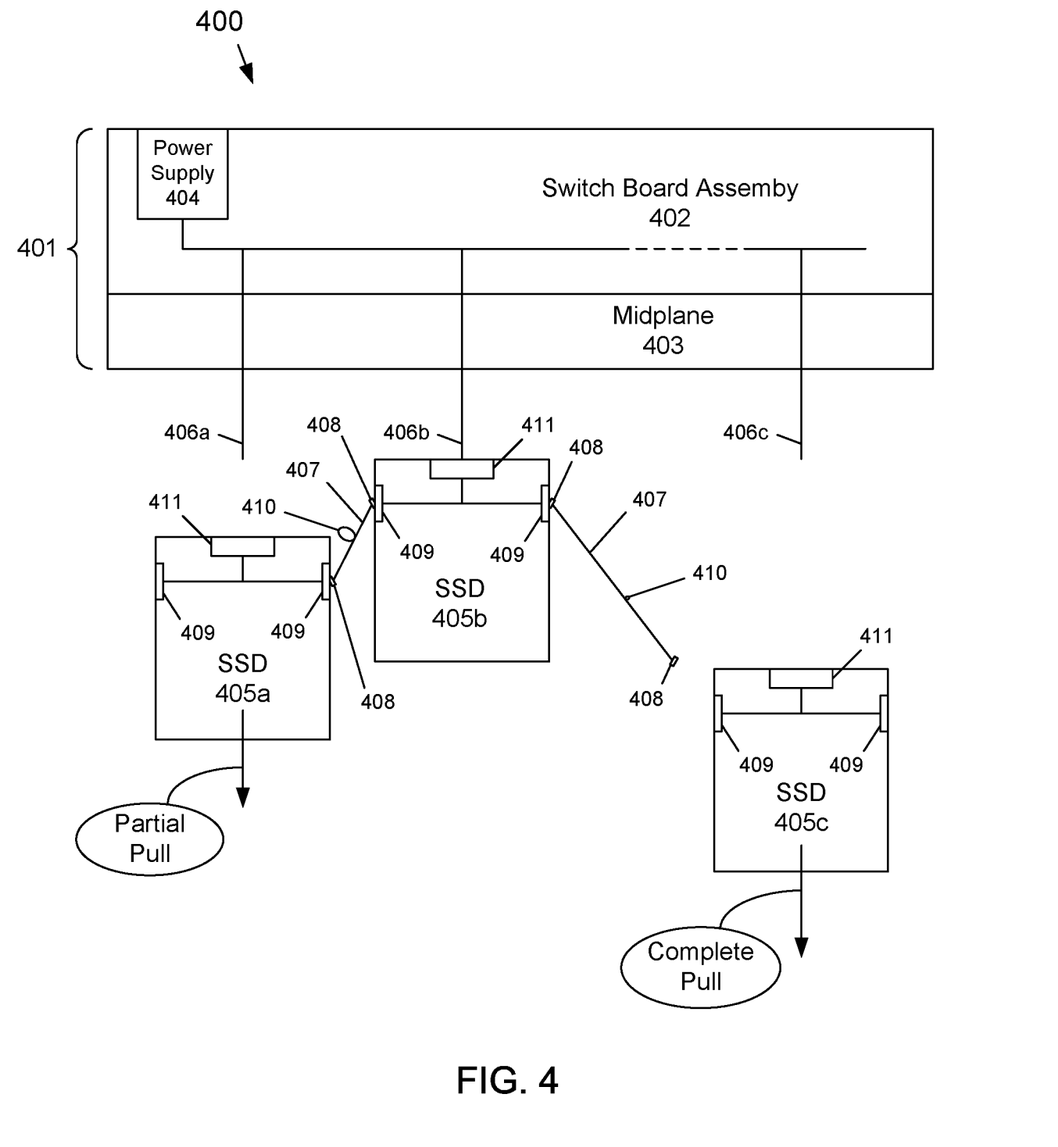
FIG. 4 depicts a block diagram of a third example embodiment of a storage system that includes separate backup power lines between neighboring SSDs that provides an emergency hold-up power for a predetermined length of time after an SPO event occurs according to the subject matter disclosed herein.

FIG. 4 depicts a block diagram of a third example embodiment of a storage system 400 that includes separate backup power lines between neighboring SSDs that provides an emergency hold-up power for a predetermined length of time after an SPO event occurs according to the subject matter disclosed herein. The storage system 400 includes a chassis 401, a switch or mother board assembly 402 and a midplane 403. A power supply 404 may be part of the switch board assembly 402. Three SSDs 405*a*-405*c* are depicted in different connective relationships with the midplane 403 and the other SSDs 405. For the example embodiment depicted in FIG. 4, the midplane 403 includes three main power connections 406*a*-406*c*. Each main power connection 406*a*-406*c* may include the typical 12V/5V/3.3V power supply lines that are normally used in current storage systems. In some embodiments, the power connections 406*a*-406*c* may be supplied through standard M.2 or U.2 connectors. It should be understood that the storage system 400 depicted in FIG. 4 may include more or fewer switch board or mother board assemblies 402, midplanes 403, power supplies 404 and SSDs 405 than depicted in FIG. 4.

As depicted in the embodiment of FIG. 4, a separate backup power line 407 extends between each neighboring SSD 405. Each respective backup power line 407 includes a connector 408 at each end of the power line 408. Each respective connector 408 is connectable to a corresponding connector 409 on an SSD 405. A hold-up power supply (not shown in FIG. 4) is connected to a connector 409 of an SSD 405. In one embodiment, a connector 408 may be coupled, or adhered, to a corresponding connector 409 on an SSD 405 using a relatively weak magnetic force. Each backup power line 407 has a length that is longer than is physically necessary to merely connect between neighboring SSDs 405, as indicated by the service loops 410. Additionally, each backup power line 407 may be tethered to the chassis 401 in a well-known manner, although not specifically depicted.

The SSD 405*b* is depicted as being fully plugged into the midplane 403. Power for the SSD 405*b* is supplied through the main power connection 406*b* and a connector 411 on the SSD 405*b*. The connectors 409 of the SSD 405*b* are electrically coupled to the connector 411. Emergency backup power may be supplied from the SSD 405*b* to either the SSD 405*a* or the SSD 405*c* through a connector 409 and a backup power line 407.

The SSD 405*a* is depicted as being partially pulled out from the midplane 403 to the extent that the main power connection 406*a* has been disconnected. The SSD 405*a* detects the immediate loss of power and generates, for example, an internal powerfail_detected signal that switches the power source of the SSD to a hold-up power supply (not shown) that is internal to the SSD, and that triggers flushing of any host data write request that the SSD has acknowledged (and is still in the write data cache) and (optionally) any critical SSD controller state information. Emergency backup power may be supplied through the line 407 coupled to the SSD 405*b* as the SSD 405*a* is pulled from the midplane 403. The weak magnetic force adhering the connector 408 to an SSD connector 409 may be sufficiently strong to keep the two connectors connected as an SSD 405 is being pulled out from the midplane 403.

The SSD 405*c* is depicted as being completely pulled out from the midplane 403 to the extent that the connector 406 has become disconnected from the connector 409 of the SSD 405*c*. By this time in the sequence of pulling an SSD out from the midplane 403, the SSD has flushed any data that needed to be saved. The length of the backup power supply lines 407 may be selected based on the time needed to flush a predetermined amount of data in a write data cache. Again, if, for example, a PLP window Δt of 10 ms of emergency hold-up power is needed to allow 80 Mbytes of data to be flushed to NAND, the length of a power supply line 407 is selected to be the distance that an SSD moves in 10 ms as it is pulled out from the midplane 403. In one embodiment, the distance that an SSD moves in the predetermined amount of time may be based on an estimate of an average speed that an SSD may be removed from the midplane 403. In another embodiment, the distance that an SSD moves in the predetermined amount of time may be based on a worst-case maximum speed that the SSD may be removed from the midplane 403.

In some storage-system configurations, the existing power wiring layout may be fixed and not changeable. One example embodiment of an SSD device disclosed herein includes a wireless connection to one or more neighboring SSD devices to provide an emergency power supply without needing to change the power wiring layout of the storage system. A solution manager BMC may query the SSDs in the system to determine their respective capabilities, such as whether an SSD device and at least one neighboring SSD device supports a wireless PLP protection capability. If so, the BMC may enable the write data cache for one or both of the SSD devices to improve overall SSD device and system performance.

Figure 5A:
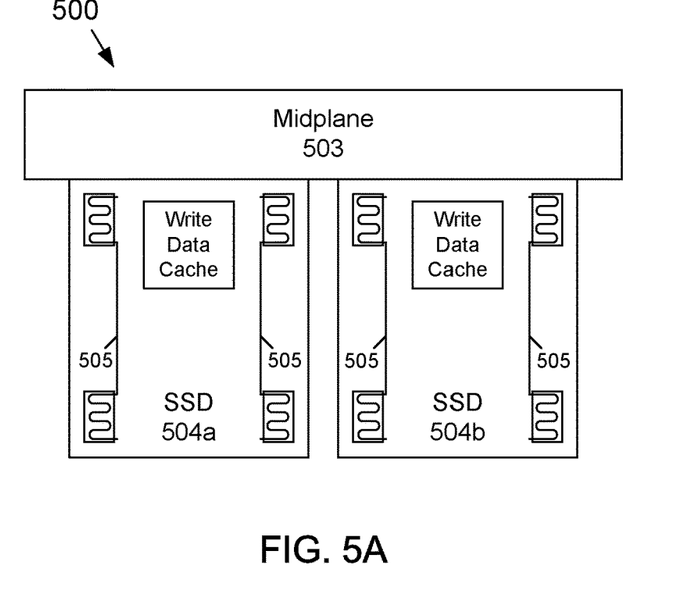
FIG. 5A depicts a block diagram of a fourth example embodiment of a portion of a storage system that includes SSD devices having a wireless power connections to neighboring SSDs that provides an emergency hold-up power according to the subject matter disclosed herein.

FIG. 5A depicts a block diagram of a fourth example embodiment of a portion of a storage system 500 that includes SSD devices having a wireless power connections to neighboring SSDs that provides an emergency hold-up power according to the subject matter disclosed herein. The wireless power connection between neighboring SSD devices may be used to provide emergency hold-up power for a predetermined length of time after an SPO event is detected. In FIG. 5A, the portion of the storage system 500 depicted includes a midplane 503. In one embodiment, the wireless power connection may comply with a Qi and/or a Power Matters Alliance (PMA) standard. The main power connections to SSDs 504 that are connected to the midplane 503 are not shown, but may be similar to the main power connections 306 depicted in FIG. 3.

Each SSD 504 depicted in FIG. 5A includes wireless charging antennas 505 that are physically located within an SSD so that the SSD may receive a wireless charging signal from one or more neighboring SSDs and so neighboring SSDs may also receive a wireless charging signal from the SSD. The wireless charging antennas 505 may be connected to a hold-up power supply (not shown in FIGS. 5A and 5B). In one embodiment, an SSD 504 may include two wireless charging antennas 505 although any number of wireless charging antennas may be used. Also, for this example embodiment, both SSDs 504a and 504b have a write data cache that has been enabled.

Figure 5B:
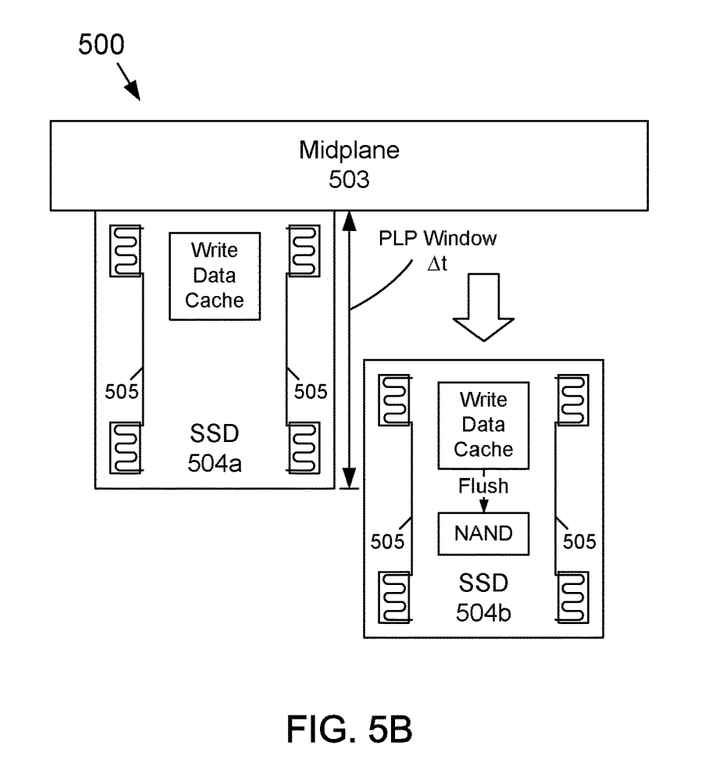
FIG. 5B depicts an SSD that has been partially removed from a midplane to the extent that the SSD has become disconnected from the main power supply.

In FIG. 5B, the SSD 504b has been partially removed from the midplane 503 to the extent that the SSD 504b has become disconnected from the main power supply. The SSD 504b detects the immediate loss of power and generates, for example, an internal powerfail_detected signal switches the power source of the SSD to a hold-up power supply (not shown) that is internal to the SSD, and that triggers flushing of any host data write request that the SSD has acknowledged (and is still stored in the write data cache) and (optionally) any critical SSD controller state information. Emergency hold-up power may be supplied through the wireless connection to the antennas 505 of the SSD 504a as the SSD 504b is pulled from the midplane 503. The PLP window Δt is directly related to the transmission/reception range of the antennas 505. In most cases, the strength of the power signal will be sufficiently low so that the coupling between neighboring SSDs will be a near field event. The size of the write data cache of an SSD 504 is also dependent upon the PLP window Δt, which may be detectable by the SSD device and selectively programmable based on the PLP window Δt.

In storage-system configurations in which the power wiring layout may be changeable, the example embodiments of SSD devices having a wireless charging capability (as in FIGS. 5A and 5B) may be used with a chassis that also includes wireless charging antennas. As with this example storage-system configuration, a solution manager BMC may query the SSDs in the system to determine their respective capabilities, such as whether an SSD device supports a wireless PLP protection capability. If so, the BMC may enable the write data cache for the SSD device to improve overall SSD device and system performance.

Figure 6A:
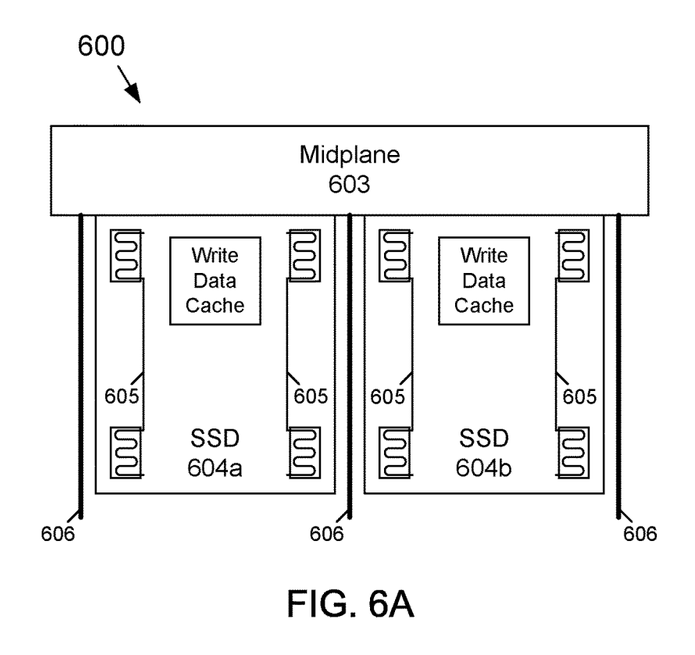
FIG. 6A depicts a block diagram of a fifth example embodiment of a portion of a storage system that includes wireless power connections to a midplane that provides an emergency hold-up power for a predetermined length of time after an SPO event occurs according to the subject matter disclosed herein.

FIG. 6A depicts a block diagram of a fifth example embodiment of a portion of a storage system 600 that includes wireless power connections to a midplane that provides an emergency hold-up power for a predetermined length of time after an SPO event occurs according to the subject matter disclosed herein. The portion of the storage system 600 depicted includes a midplane 603. The main power connections provided by the midplane 603 to SSDs 604 that are connected to the midplane 603 are not shown, but may be similar to the main power connections 306 depicted in FIG. 3.

The midplane 603 includes a plurality of wireless charging antennas 606 that wirelessly couple to an SSD to supply emergency backup power after an SPO event has been detected. Each SSD 604 depicted in FIG. 6A includes one or more wireless charging antennas 605 that may be physically located within an SSD in order to receive a wireless charging signal from one or more of the antennas 606. The wireless charging antennas 605 may be connected to a hold-up power supply (not shown in FIGS. 6A and 6B). In one embodiment, an SSD 604 may include two wireless charging antennas 605 although any number of wireless charging antennas may be used. Also, for this example embodiment, both SSDs 604a and 604b have a write data cache that has been enabled.

Figure 6B:
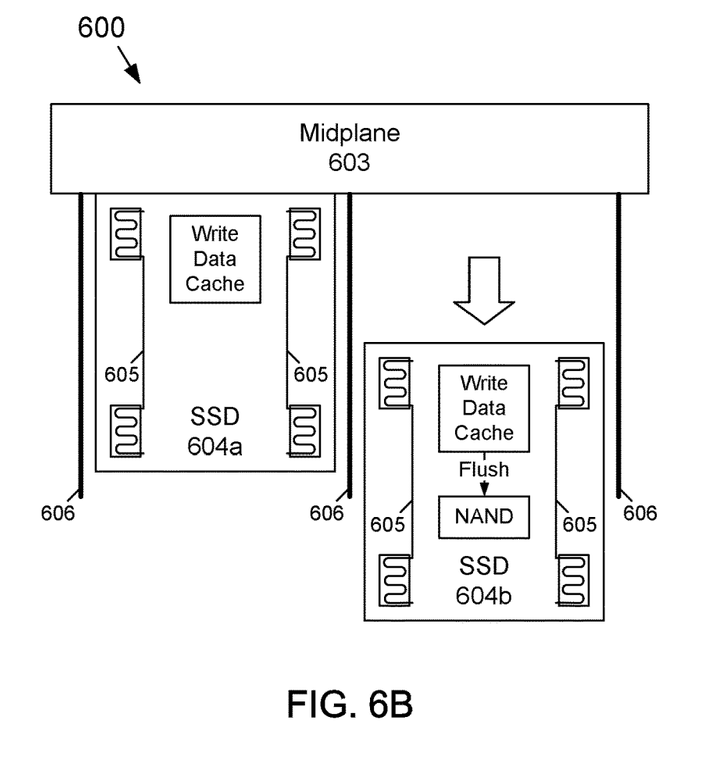
FIG. 6B depicts an SSD that has been partially removed from a midplane.

In FIG. 6B, the SSD 604b has been partially removed from the midplane 605. The SSD 604b detects the immediate loss of power and generates, for example, an internal powerfail_detected signal that switches the power source of the SSD to a hold-up power supply (not shown) that is internal to the SSD, and that triggers flushing of any host data write request that the SSD has acknowledged (and is still stored in the write data cache) and (optionally) any critical SSD controller state information. Emergency backup power may be supplied through the wireless connection between the antennas 605 and the antennas 606 of the midplane 603 as the SSD 604b is pulled from the midplane 603. Similar to FIG. 5A and 5B, the PLP window Δt for the SSDs of FIGS. 6A and 6B is directly related to the transmission/reception range of the antennas 605 and 606. The PLP window Δt (not indicated in FIGS. 6A and 6B) may be configured to be longer than the PLP window Δt of FIGS. 5A and 5B depending on the physical space available for the antennas 606. In most cases, the strength of the power signal will be sufficiently low so that the coupling between neighboring SSDs will be a near field event. The size of the write data cache of an SSD 604 is also dependent upon the PLP window Δt, which may be detectable by the SSD device and selectively programmable based on the PLP window Δt.

Figure 7:
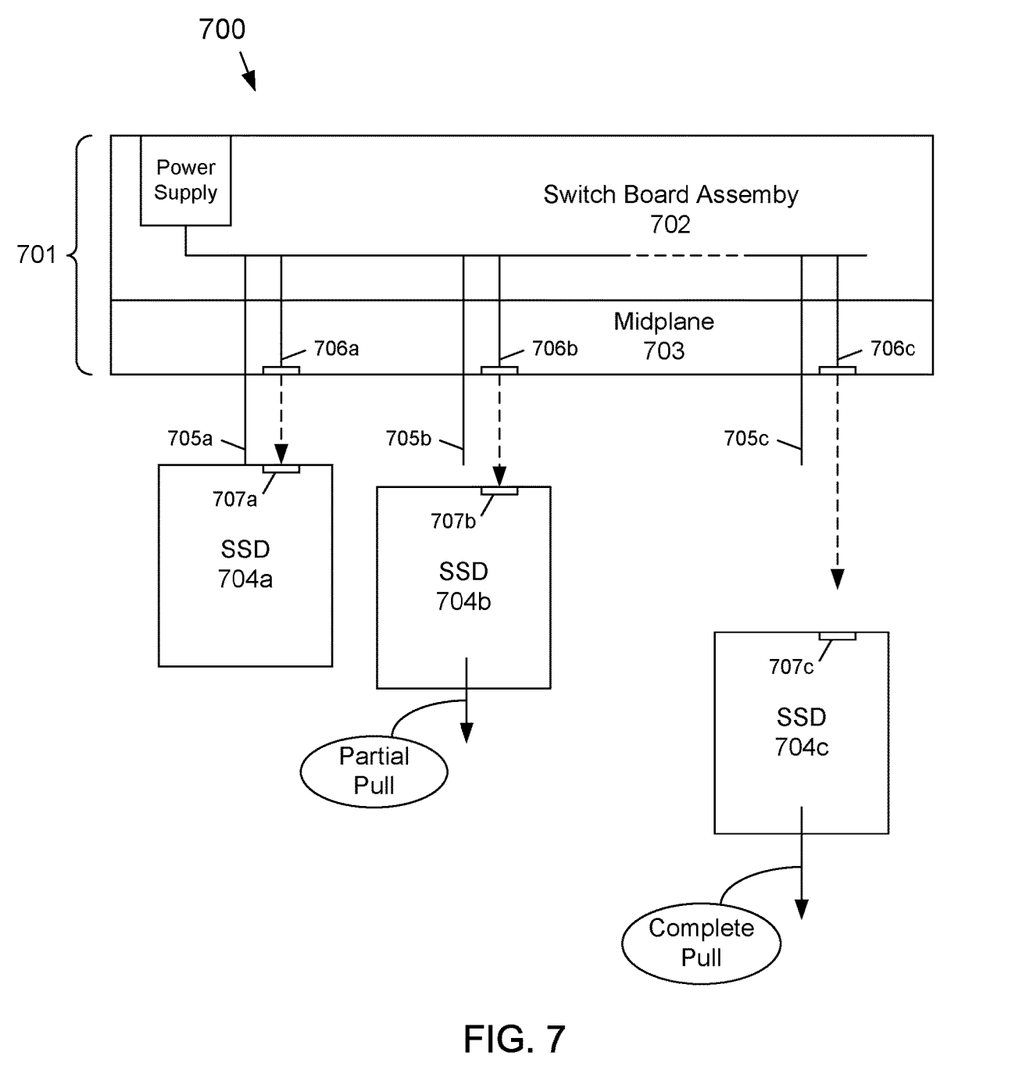
FIG. 7 depicts a block diagram of a sixth example embodiment of a storage system that includes a high-energy light source that provides an emergency hold-up power for a predetermined length of time after an SPO event occurs according to the subject matter disclosed herein.

FIG. 7 depicts a block diagram of a sixth example embodiment of a storage system 700 that includes a high-energy light source that provides an emergency hold-up power for a predetermined length of time after an SPO event occurs according to the subject matter disclosed herein. The storage system 700 includes a chassis 701, a switch board assembly 702 and a midplane 703. Three SSDs 704a-704c are depicted in different connective relationships with the midplane 703. For the example embodiment depicted in FIG. 7, the midplane 703 includes three main power connections 705a-705c. Each main power connection 705a-705c may include the typical 12V/5V/3.3V power supply lines that are normally used in current storage systems. In some embodiments, the power connections 705a-705c may be supplied through a standard M.2 or a standard U.2 connector. It should be understood that the storage system 700 depicted in FIG. 7 may include more or fewer switch board assemblies 702, midplanes 703 and SSDs 704 than depicted in FIG. 7.

Additionally, the chassis 701 includes at least one high-energy light source 706, such as a laser or other similar high-energy light source, for each SSD slot. For the example embodiment depicted in FIG. 7, three high-energy light sources 706a-706c are provided. Each respective SSD 704 may include, for example, a photo-voltaic detector 707 that is positioned to receive the light from a corresponding light source 706. The photo-voltaic detector 707 may be connected to a hold-up power supply (not shown in FIG. 7). Each light source 706 outputs a light energy that is sufficiently strong for an SSD to convert the light energy into emergency hold-up power as an SSD is unplugged from the midplane 703. In one embodiment, the light source provides light energy over a range of between about 6 inches to about 12 inches.

The SSD 704a is depicted as being fully plugged into the midplane 703. Power for the SSD 704a is supplied through the main power connection 705a, and through the high-energy light link between the light source 706a and the photo-voltaic detector 707 of the SSD 704a.

The SSD 704b is depicted as being partially pulled out from the midplane 703 to the extent that the main power connection 605b has been disconnected. The SSD 704b detects the immediate loss of power and generates, for example, an internal powerfail_detected signal that switches the power source of the SSD to a hold-up power supply (not shown) that is internal to the SSD, and that triggers flushing of any host data write request that the SSD has acknowledged (and is still in the write data cache) and (optionally) any critical SSD controller state information. Emergency hold-up power may be supplied through the high-energy light link between the light source 706 and the photo-voltaic detector 707 as the SSD 704b is pulled from the midplane 703.

The SSD 704c is depicted as being completely pulled out from the midplane 703 to the extent that the detector 707c does not receive enough light energy to sustain the emergency hold-up power. By this time in the sequence of pulling an SSD out from the midplane 703, the SSD has flushed any data that needs to be saved. The level of energy of the light source 706 may be selected based on the time needed to flush a predetermined amount of data in a write data cache. The predetermined amount of time for flushing data in the write data cache is referred to herein as the PLP window Δt. If, for example, a PLP window Δt of 10 ms of emergency hold-up power is needed to allow 80 Mbytes of data to be flushed to NAND, the strength or intensity of the light energy is selected to allow the detector 707 to receive the light energy for at least 10 ms as the SSD is pulled out from the midplane 703.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

The invention claimed is:

1. A solid-state drive (SSD), comprising:
a first connector having a predetermined form factor and configured to be connected to a corresponding connector of a midplane, the first connector including a main power connection that is configured to be connected to a main power supply of the midplane through the first connector; and
a hold-up power supply internal to the SSD, the hold-up power supply receiving hold-up power from an external power source through a backup power connection that is separate from the main power connection and provides power to store host data write requests from a write data cache to persistent storage based on the first connector being disconnected from the main power connection of the midplane.

2. The SSD of claim 1, wherein the hold-up power supply receives hold-up power from the external power source to store controller state data of the SSD based on the first connector being disconnected from the main power connection of the midplane.

3. The SSD of claim 1, wherein the write data cache has a size that is selectably configurable and that is selectably enabled.

4. The SSD of claim 1, wherein the backup power connection comprises at least one elongated pin through which the hold-up power is received by the hold-up power supply.

5. The SSD of claim 1, wherein the backup power connection comprises at least one second connector coupled to the hold-up power supply and configured to connect to the external power source.

6. The SSD of claim 5, wherein the at least one second connector is further configured to receive a corresponding connector at a first end of a cable connected to the external power source.

7. The SSD of claim 6, wherein a second end of the cable connected to the external power source is fastened to the midplane.

8. The SSD of claim 6, wherein a second end of the cable connected to the external power source is connected to a second SSD.

9. The SSD of claim 5, wherein the backup power connection comprises a wireless connection.

10. The SSD of claim 9, wherein the backup power connection comprises a radio-frequency coupling.

11. The SSD of claim 10, wherein the radio-frequency coupling is to at least one second SSD.

12. The SSD of claim 10, wherein the radio-frequency coupling is to at least one antenna connected to the midplane.

13. The SSD of claim 9, wherein the backup power connection comprises a light link.

14. A storage system, comprising:
a midplane comprising at least one first connector having a predetermined form factor and configured to be connected to a solid-state drive (SSD) having a corresponding connector that mates to the at least one first connector, the at least one first connector including a main power connection; and
at least one SSD, comprising:
a second connector having the predetermined form factor and configured to be connected to a corresponding first connector of the midplane, the second connector including a main power connection that is configured to be connected to the main power connection of the midplane through the second connector; and
a hold-up power supply internal to the SSD, the hold-up power supply receiving hold-up power from an external power source through a backup power connection that is separate from the main power connection and provides power to store host data write requests from a write data cache to persistent storage based on the second connector being disconnected from the main power connection of the midplane.

15. The storage system of claim 14, wherein the hold-up power supply receives hold-up power from the external power source to store controller state data of the SSD based on the second connector being disconnected from the main power connection of the midplane.

16. The storage system of claim 14, wherein the write data cache has a size that is selectably configurable and that is selectably enabled.

17. The storage system of claim 14, wherein the backup power connection comprises at least one elongated pin through which the hold-up power is received by the hold-up power supply.

18. The storage system of claim 14, wherein the backup power connection comprises at least one third connector coupled to the hold-up power supply and configured to be connected to the external power source, the third connector configured to receive a corresponding connector at a first end of a cable connected to the external power source.

19. The storage system of claim 18, wherein a second end of the cable connected to the external power source is fastened to the midplane or to a second SSD.

20. The storage system of claim 14, wherein the backup power connection comprises a wireless connection to the external power source.

21. The storage system of claim 20, wherein the wireless connection comprises a radio-frequency coupling to the midplane or to a second SSD.

22. The storage system of claim 20, wherein the wireless connection comprises a light link.

* * * * *